March 7, 1967  J. B. DAVIS  3,307,912
METHOD FOR ANALYZING SOIL GAS
Filed June 21, 1963
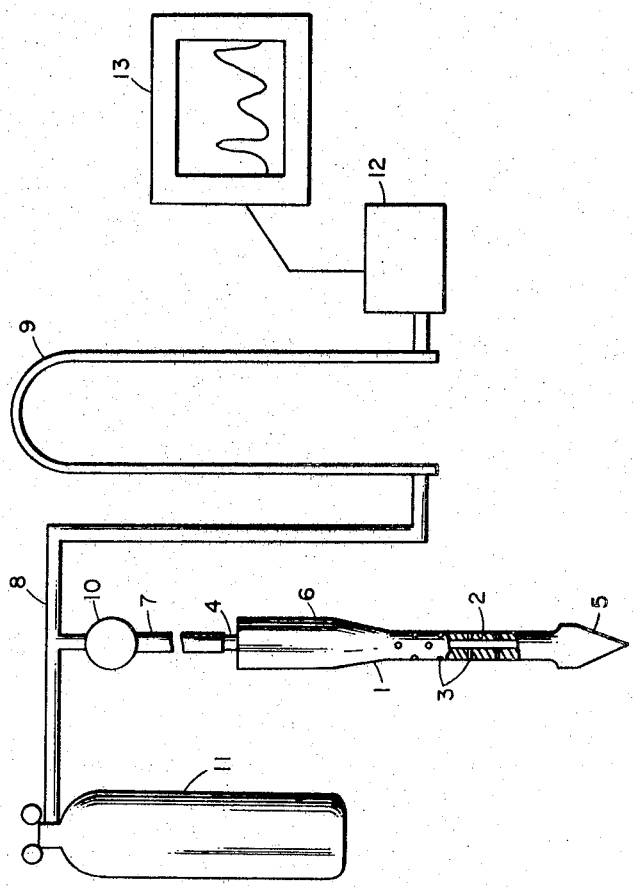
JOHN B. DAVIS INVENTOR.
BY *William D. Jackson*
ATTORNEY

United States Patent Office 3,307,912
Patented Mar. 7, 1967

3,307,912
METHOD FOR ANALYZING SOIL GAS
John B. Davis, Dallas, Tex., assignor to Mobile Oil Corporation, a corporation of New York
Filed June 21, 1963, Ser. No. 289,476
1 Claim. (Cl. 23—232)

This invention involves a method and apparatus for analyzing soil gases and more particularly a method and apparatus for analyzing soil gases in geochemical prospecting operations.

It is known that small quantities of hydrocarbons present in soil gases adjacent the surface of the earth may be indicative of the presence of hydrocarbon minerals, e.g., oil and gas, in the underlying strata. Thus, in prospecting for such hydrocarbon minerals, techniques have been developed in which soil gases are analyzed for their hydrocarbon content. These techniques, as well as various others, are known generally as geochemical prospecting.

A common geochemical prospecting method involves obtaining relatively large samples of soil gases, condensing these samples to smaller samples of increased hydrocarbon concentration, and then qualitatively and quantitatively analyzing them. This method requires elaborate equipment which is not suitable for field use. Also, it requires sample containers which are relatively cumbersome and expensive. In another techniques, a hole is drilled in the earth's surface and then sealed for a period of time to allow the soil gases to accumulate therein. The gases then are withdrawn from the hole and passed to an analyzing system. While this technique is adaptable to field use, it is time consuming and requires a relatively large number of manipulative steps. In addition, the drilling step itself may result in the generation of light hydrocarbon gases, apparently through the cracking of heavier hydrocarbons due to the heat generated by the drilling operation. This, of course, will cause the subsequent analysis to be inaccurate.

It is therefore an object of this invention to provide a method of analyzing soil gases, particularly in geochemical prospecting operations, which is rapid and highly accurate and which can be carried out entirely in the field.

It is a further object of the present invention to provide apparatus which will obtain soil gas samples and qualitatively and quantitatively analyze such samples in a single operation.

In carrying out the invention, a gas probe first is inserted into an undisturbed portion of the ground. Gas from the adjacent soil is withdrawn through the probe and passed to a chromatographic column which is calibrated with respect to the emergence times of the hydrocarbons of interest. At least a portion of the effluent from the chromatographic column then is burned in a hydrogen flame to produce ionized gases and a signal is generated which is representative of the amount of ionized gases produced by this reaction. This signal, which is indicative of the concentration of hydrocarbons in the soil gas, is recorded as a function of time.

In a further aspect of the invention, there is provided a system for carrying out soil gas analysis in the field. This system includes a hollow probe having a cutting edge at one end, at least one gas intake, and an outlet. A chromatographic column and an ionization detector are fluidly connected to the outlet whereby gas may be withdrawn from the soil and subjected to a quantitative and qualitative analysis in a single operation.

A more detailed description will now be made with reference to the drawing which is a diagrammatic illustration, partly in section, of one embodiment of the invention.

With reference to the drawing, there is provided a gas conducting probe 1 having an interior passageway 2 which includes a plurality of transverse ports or intakes 3 and an outlet 4. The probe is provided with a conical cutting end 5 which at its maximum diameter is larger than the diameter of the intermediate portion of the probe in which the ports 3 are located. The opposite end portion 6 of the probe is flared outwardly to a diameter slightly greater than the diameter of the cutting end. When the probe is driven into the ground, this portion will provide a seal with the wall of the hole formed by the cutting end, thus providing a chamber in which suction may be applied in order to withdraw gas from the soil.

A fluid conduit formed by lines 7 and 8 connects the outlet end of passageway 2 to a chromatographic column 9. At least a portion of line 7 is flexible or extensible in order that the probe may be projected with respect to the remaining elements of the system. A pump 10 is provided in line 7 in order to withdraw gases from the soil and a carrier gas source 11 is also connected to the conduit extending from the probe to the chromatographic column. The carrier gas source may be a conventional "bottled gas" container having suitable pressure indicating and flow regulating means.

Exemplary of a suitable chromatographic column is a "molecular sieve" column formed by a 6-foot, ¼-inch diameter stainless steel column packed with cylindrical zeolite pellets. The pellets are ¹⁄₁₆ inch in diameter and about ¼ inch long and are available from Linde Company, Division of Union Carbide Corporation, New York, New York, identified as No. 10X pellets. The column is calibrated with respect to the emergence times of the various hydrocarbon components of the soil gas as explained more fully below.

An ionization detector 12 which will detect small concentrations of methane as well as the heavier petroleum gases is connected to the discharge end of the chromatographic column. The detector is preferably of the hydrogen flame type in which an ionizing reaction is produced by a small hydrogen flame maintained within an ionization chamber. The ionization chamber is provided with electrodes which are exposed to the flame. The difference in potential across these electrodes will remain constant until such time as a hydrocarbon component of the soil gas is injected into the detector. The hydrocarbon is burned as it is exposed to the flame and the products of combustion are ionized, thus resulting in an increase in the difference of potential across the electrodes. This signal, which is representative of the extent of ionization produced by the ionizing reaction and therefore the concentration of the hydrocarbon component, is recorded by a recorder 13 as a function as a function of time. A suitable hydrogen flame ionization detector and recorder may be obtained as a unit from Wilkens Instrument & Research, Inc., Walnut Creek, California, identified as their Aerograph Hy-Fi model No. A–600–B.

Other ionization detectors such as the argon type may be used in carrying out the invention. However, a flame detector of the type described is preferred since it is highly sensitive to petroleum gases, for example, it will detect on the order of 5–10 parts per billion of such gases in 1 ml. of air, and yet is insensitive to the presence of air and water vapor as well as most other inorganic compounds. This is particularly advantageous insofar as the instant invention is concerned since the soil gas samples will usually contain air and water vapor, the detection of which is unnecessary and burdensome in geochemical prospecting operations. Thus, no precautions need be taken with regard to air and water vapor when using the flame ionization detector.

As noted above, the chromatographic column is calibrated with respect to the emergence times of the hydrocarbon gases. The emergence time for a particular hydrocarbon is the period between the time at which a sample is injected into the chromatographic column and the time at which the peak signal representative of the ionization of that gas is recorded. For example, utilizing helium as the carrier gas at a rate of 30 ml. per minute, the emergence times of methane, ethane, and propane for the above-described column at a temperature of 75° C. will be 2.6, 4.5, and 10.5 minutes, respectively, for a 0.1 ml. sample of air containing these hydrocarbons.

While not so shown, the above-described apparatus preferably will be mounted on a truck or other vehicular means, thus providing for rapid movement of the soil gas analysis system from one station to another.

In carrying out the method of the instant invention, fluid communication is established between the chromatographic column and the soil. This preferably is accomplished by forcing the probe into an undisturbed portion of the ground, i.e., a portion of the ground which has not been subjected to drilling or other stresses which would result in the generation of light hydrocarbons such as methane. The pump 10 is then started to withdraw gas from the soil and force it into the line 8 where it is mixed with the carrier gas, e.g., helium, from the container 11. The soil gas and carrier gas then flow to the intake end of the chromatographic column. The hydrocarbons will move through the chromatographic column at varying rates which are largely dependent upon their respective vapor pressures, a gas of a relatively high vapor pressure moving through the column at a faster rate than a gas of lower vapor pressure. The several hydrocarbon components of the gas thus will appear in the effluent from the column at different times.

The hydrocarbon gases flow from the chromatograph to the ionization detector where they are subjected to an ionizing reaction. As each of the hydrocarbon gases is subjected to this reaction, a signal representative of the extent of ionization is generated and recorded as a function of time in order to give both a quantitative and qualitative analysis with regard to the hydrocarbon gases in the soil gas sample.

In carrying out geochemical prospecting operations, the above-described method may be carried out at essentially regular intervals, e.g., once every 5 to 10 acres, over a designated portion of the earth's surface. The results will then be plotted on a map, e.g., in terms of the ratio of methane to ethane, propane, n-butane, and iso-butane, to give an indication of the presence or absence of underlying hydrocarbon minerals. If the results of this survey point to the possibility of mineral deposits in a certain area, the survey procedure may be repeated in this area at closer intervals.

In practicing the present invention, the following precautions should be observed. Since methane is a product of anaerobic bacterial decomposition of organic matter in the soil, it is advisable to inject the flared portion of the probe below the predominant accumulation of soil organic matter, usually a depth of eighteen inches or more. Also, the results of the analyses should be interpreted taking into consideration that they may include the detection of hydrocarbons produced during such bacterial decomposition. In most cases, the ratio of methane to the higher petroleum gases will be of primary interest while the presence of methane will in itself usually be of little significance in geochemical prospecting. Since ethane and the higher petroleum gases are produced to a much lesser extent than methane during the above-described bacterial decomposition, these ratios may be used as indicators of bacterial activity. For example, methane to ethane ratios which reasonably approach those found in natural gases, e.g., from 20:1 to 50:1, may be indicative of underlying oil or gas deposits. However, considerably higher methane to ethane ratios, e.g., 10,000:1, may be indicative only of bacterial activity. Thus, utilizing the present invention, the ratio of methane to higher petroleum gases may be accurately determined in the field and soil gas hydrocarbons due to underlying mineral deposits thus may be distinguished from those due to bacterial activity.

Having described specific embodiments of the invention, it is understood that further modifications may be suggested to those skilled in the art, and it is intended to cover all such modifications as fall within the scope of the appended claim.

I claim:

A method of geochemical prospecting, comprising the steps of:
 (a) forcing a gas conducting probe into an undisturbed portion of the ground,
 (b) flowing gas from the adjacent soil through said probe to a chromatographic column whereby the component hydrocarbon gases of the soil gas will appear in the effluent from said column at different times,
 (c) burning at least a portion of said effluent comprising a plurality of component hydrocarbon gases in a hydrogen flame whereby ionized gases are produced,
 (d) generating a signal representative of the amount of ionized gases produced by step (c),
 (e) recording said signal as a function of time, and
 (f) repeating steps (a), (b), (c), (d), and (e) at intervals over a designated portion of the earth's surface.

References Cited by the Examiner

UNITED STATES PATENTS

| | | | |
|---|---|---|---|
| 3,049,409 | 8/1962 | Dower | 23—230 |
| 3,084,553 | 4/1963 | Cullinan et al. | 73—421.5 |
| 3,169,389 | 2/1965 | Green et al. | 23—232 |
| 3,180,983 | 4/1965 | Hall et al. | 23—230 |
| 3,239,311 | 3/1966 | Luehrmann et al. | 23—232 |

MORRIS O. WOLK, *Primary Examiner.*

H. A. BIRENBAUM, *Assistant Examiner.*